United States Patent
Kim et al.

(10) Patent No.: US 8,352,095 B2
(45) Date of Patent: Jan. 8, 2013

(54) ELECTRIC POWER GENERATION DEVICE, ELECTRIC POWER DEMAND DEVICE, AND ELECTRIC POWER CONTROL SYSTEM, AND METHOD OF CONTROLLING ELECTRIC POWER

(75) Inventors: Sun Me Kim, Daejeon (KR); Ho Young Song, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 253 days.

(21) Appl. No.: 12/887,788

(22) Filed: Sep. 22, 2010

(65) Prior Publication Data

US 2011/0071699 A1   Mar. 24, 2011

(30) Foreign Application Priority Data

Sep. 23, 2009  (KR) .................. 10-2009-0090272
Dec. 14, 2009  (KR) .................. 10-2009-0123866
Sep. 9, 2010   (KR) .................. 10-2010-0088615

(51) Int. Cl.
| | |
|---|---|
| G05D 3/12 | (2006.01) |
| G05D 5/00 | (2006.01) |
| G05D 9/00 | (2006.01) |
| G05D 11/00 | (2006.01) |
| G05D 17/00 | (2006.01) |
| G01R 11/56 | (2006.01) |
| G01R 21/133 | (2006.01) |
| G01R 21/06 | (2006.01) |
| G06F 17/00 | (2006.01) |

(52) U.S. Cl. ............ 700/297; 700/291; 705/412; 702/62
(58) Field of Classification Search .................. 700/286, 700/287, 291, 295, 297, 298; 702/57, 60–62; 705/412

See application file for complete search history.

(56) References Cited

U.S. PATENT DOCUMENTS

| | | | | |
|---|---|---|---|---|
| 7,089,089 | B2* | 8/2006 | Cumming et al. ............ | 700/295 |
| 7,105,950 | B2* | 9/2006 | Bemat et al. .................... | 307/52 |
| 7,203,849 | B2* | 4/2007 | Dove ............................. | 713/300 |
| 7,831,843 | B2* | 11/2010 | Brundridge et al. .......... | 713/300 |
| 7,921,306 | B2* | 4/2011 | Dove ............................. | 713/300 |
| 8,103,389 | B2* | 1/2012 | Golden et al. ................ | 700/295 |
| 2010/0076835 | A1* | 3/2010 | Silverman ................... | 705/14.33 |
| 2010/0179862 | A1* | 7/2010 | Chassin et al. .................. | 705/10 |
| 2010/0217452 | A1* | 8/2010 | McCord et al. ................ | 700/295 |
| 2010/0217549 | A1* | 8/2010 | Galvin et al. ................... | 702/62 |

* cited by examiner

*Primary Examiner* — Crystal J Barnes-Bullock
(74) *Attorney, Agent, or Firm* — Staas & Halsey LLP

(57) ABSTRACT

An electric power generation device includes: a storage unit that stores information about the electric power generation device; a transmitting unit that transmits information about the electric power generation device to a neighboring electric power demand device; a receiving unit that receives an electric power demand request from the neighboring electric power demand device; and an allocation unit that allocates electric power according to the electric power demand request.

19 Claims, 5 Drawing Sheets

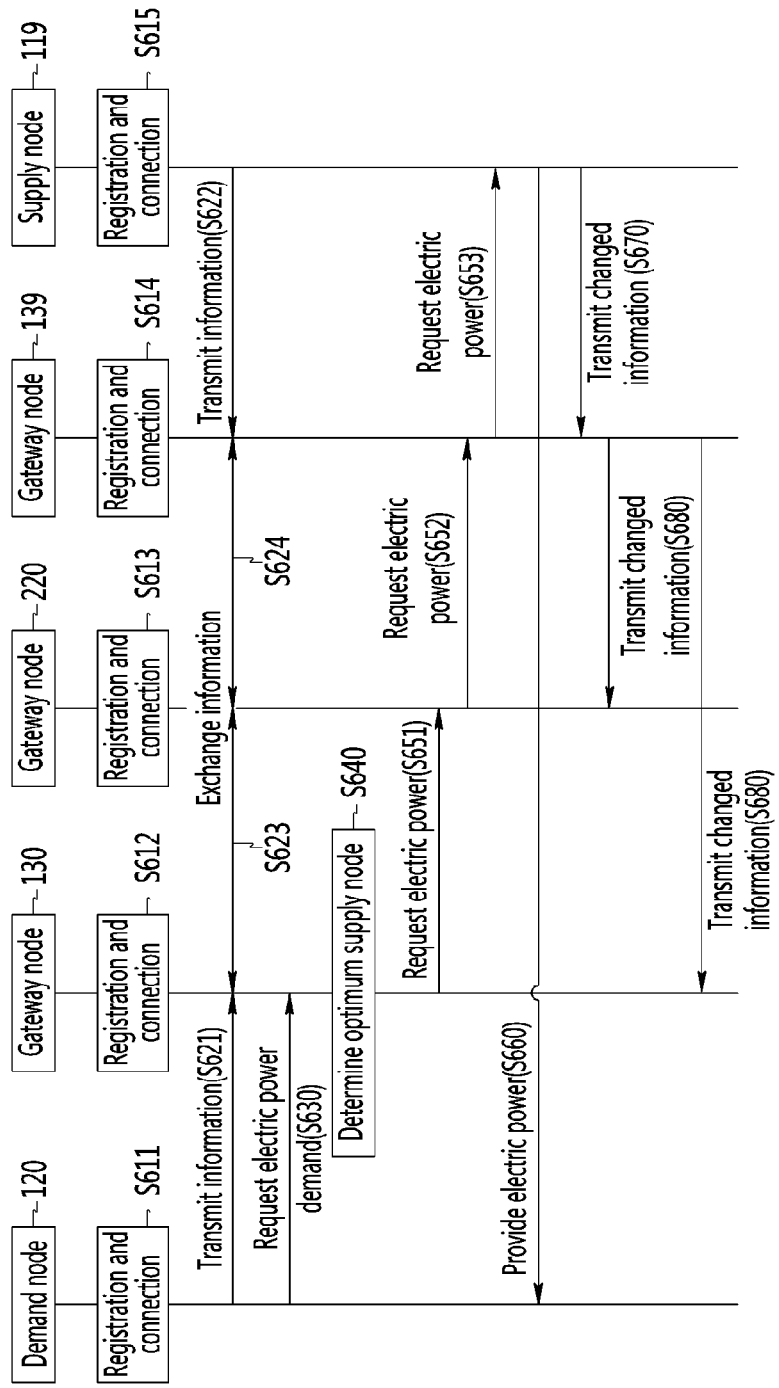

ELECTRIC POWER GENERATION DEVICE, ELECTRIC POWER DEMAND DEVICE, AND ELECTRIC POWER CONTROL SYSTEM, AND METHOD OF CONTROLLING ELECTRIC POWER

CROSS-REFERENCE TO RELATED APPLICATION

This application claims priority to and the benefit of Korean Patent Application Nos. 10-2009-0090272, 10-2009-0123866, and 10-2010-0088615 filed in the Korean Intellectual Property Office on Sep. 23, 2009, Dec. 14, 2009, and Sep. 9, 2010, the entire contents of which are incorporated herein by reference.

BACKGROUND OF THE INVENTION (a) Field of the Invention

The present invention relates to an electric power generation device, an electric power demand device, an electric power control system, and a method of controlling electric power.

(b) Description of the Related Art

A general electric power network system selects a method of generating electric power in some concentration power plant and supplying electric power to a home or a building, which is a demand place through a distribution network of a tree structure. However, such an electric power network system may deteriorate efficiency in generation, supply, and consumption processes of electric power.

In order to solve such a problem, a smart grid, which is an intelligent electric power network system that can effectively manage by using information communication technology in generation, supply, and consumption processes of electric power is developed.

The smart grid selects a method of supplying electric power to a demand place from a generation facility that holds a nearest available electric power from a demand place among various electric power generation facilities that are distributed at various positions, thereby minimizing electric power to be damaged in a distributing process and effectively performing electric power generation and supply.

However, up to the present, only a service object of a smart grid is defined, and specific control technology thereof is hardly studied.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an electric power generation device, an electric power demand device, an electric power control system, and a method of controlling electric power having advantages of sharing an electric power generation amount and holding amount between a supply facility and a demand place of electric power, dynamically processing an electric power demand request, and thus effectively controlling supply of electric power.

An exemplary embodiment of the present invention provides an electric power generation device including: a storage unit that stores information about the electric power generation device; a transmitting unit that transmits information about the electric power generation device to a neighboring electric power demand device; a receiving unit that receives an electric power demand request from the neighboring electric power demand device; and an allocation unit that allocates electric power according to the electric power demand request.

The electric power generation device may operate in one domain of an electric power network that is formed with a plurality of domains belonging to at least one of a plurality of hierarchies.

The electric power generation device may further include a connection unit that registers to the electric power network to receive a domain in which the electric power generation device is to operate and to connect to the domain.

The information about the electric power generation device may include at least one of an electric power amount in which the electric power generation device holds and a position of the electric power generation device.

The information about the electric power generation device may include at least one of an identifier, authentication information, and domain information, topology information within the electric power network, an electric power line capacity, and link information of the electric power generation device.

The transmitting unit may further transmit information about the electric power generation device to a gateway node that collects the domain information, and the receiving unit may receive the electric power demand request through the gateway node.

Another embodiment of the present invention provides an electric power demand device including: a receiving unit that receives, from a neighboring electric power generation device, information of the electric power generation device; a management unit that grasps a necessary electric power amount; and a request unit that requests an electric power demand based on the necessary electric power amount and information of the electric power generation device.

The electric power demand device may operate in one domain of an electric power network that is formed with a plurality of domains belonging to at least one of a plurality of hierarchies.

The electric power demand device may further include a connection unit that registers to the electric power network to receive a domain in which the electric power generation device is to operate and to connect to the domain.

The request unit may transmit at least one of the necessary electric power amount, an electric power use estimate time period, and constrains.

The request unit may request the electric power demand by selecting an optimum electric power generation device or request the electric power demand to a gateway node that collects the domain information.

The management unit may manage another electric power demand device; and the electric power demand may be related to the another electric power demand device.

Yet another embodiment of the present invention provides an electric power control system including a plurality of domains belonging to one of a plurality of hierarchies, the electric power control system including: a plurality of domains each include a plurality of supply nodes that transmit information including an electric power amount in which the electric power control system holds and a position of the electric power control system and that allocate electric power according to a request; and a plurality of demand nodes that receive the information and that request an electric power demand to the supply node.

The plurality of domains may further include a gateway node that collects information about the plurality of domains.

The plurality of supply nodes each may transmit the information to the gateway node and at least one of the plurality of demand nodes; and the plurality of demand nodes each may request the electric power demand by selecting an optimum supply node of the plurality of supply nodes or request the electric power demand to the gateway node.

The gateway node may exchange information about the plurality of domains with the gateway node belonging to another domain.

Yet another embodiment of the present invention provides a method of controlling electric power of an electric power control system including a plurality of domains belonging to one of a plurality of hierarchies, the method including: transmitting, by a supply node, information including a holding electric power amount and a position to a demand node; selecting, by the demand node, an optimum supply node based on the information and requesting an electric power demand; and supplying, by the optimum supply node, electric power to the demand node.

Yet another embodiment of the present invention provides a method of controlling electric power of an electric power control system including a plurality of domains belonging to one of a plurality of hierarchies, the method including: transmitting, by a supply node, information including a holding electric power amount and a position to a gateway node; requesting, by the demand node, an electric power demand to the gateway node; selecting, by the gateway node, an optimum supply node based on the information and requesting the electric power demand; and supplying, by the optimum supply node, electric power to the demand node.

The method may further including sharing, by the gateway node, the information with a gateway node belonging to another domain and requesting the electric power demand to the gateway node belonging to the another domain.

The gateway node belonging to the another domain may belong to a hierarchy different from that of the gateway node.

According to the present invention, by sharing and managing real-time information about an electric power amount in which an electric power generation facility and supply facility hold and by processing an electric power request from a demand place based on the real-time information, electric power supply can be effectively controlled.

BRIEF DESCRIPTION OF THE DRAWINGS

FIG. 6 is a flowchart illustrating a method of controlling electric power according to another exemplary embodiment of the present invention.

DETAILED DESCRIPTION OF THE EMBODIMENTS

Figure 1:
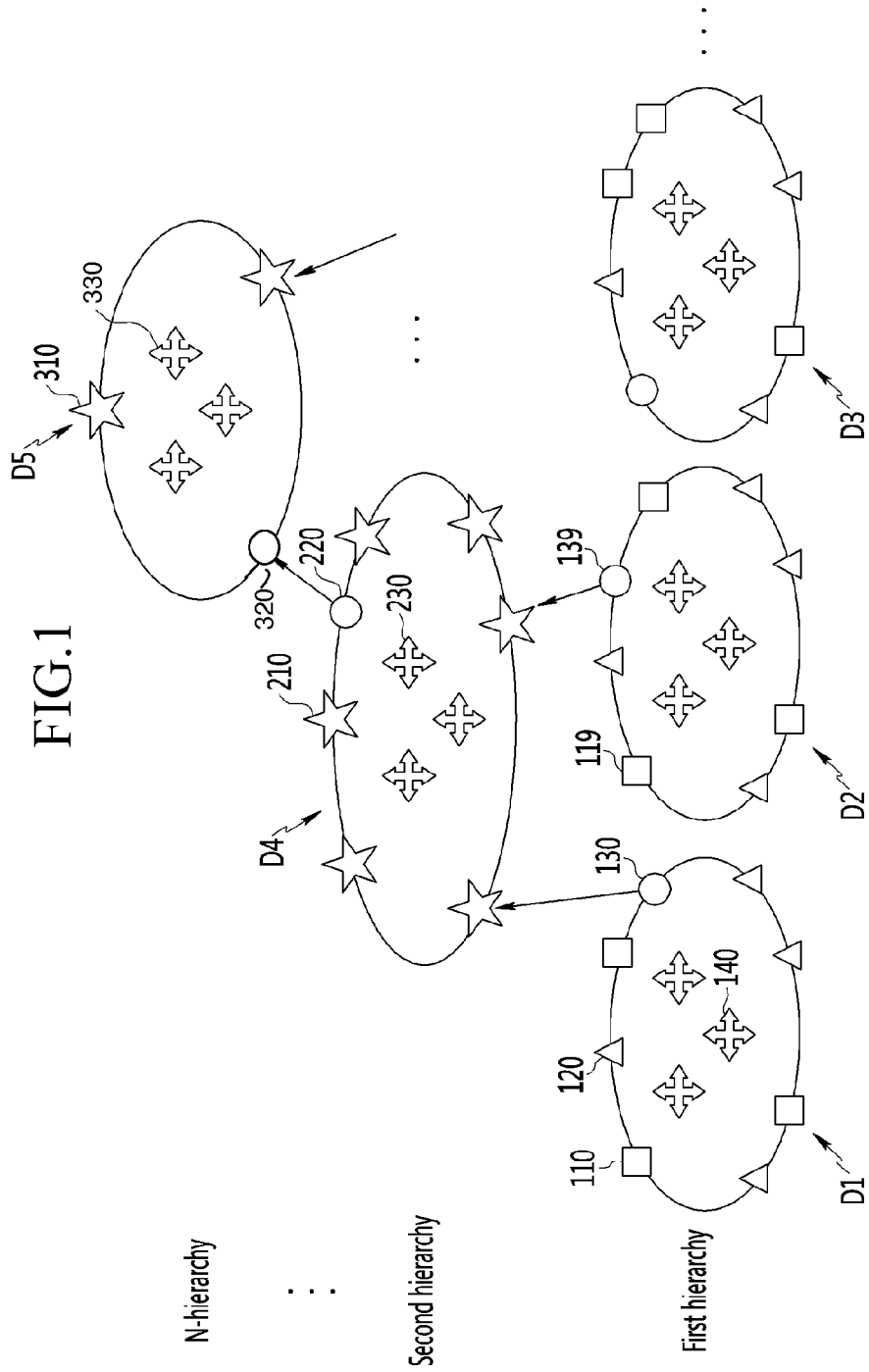
FIG. 1 is a diagram illustrating an electric power control system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising", will be understood to imply the inclusion of stated elements but not the exclusion of any other elements. In addition, the terms "-er", "-or", and "module" described in the specification mean units for processing at least one function and operation and can be implemented by hardware components or software components and combinations thereof.

Now, an electric power control device, an electric power control system, and a method of controlling electric power according to an exemplary embodiment of the present invention will be described in detail with reference to the drawings.

FIG. 1 is a diagram illustrating an electric power control system according to an exemplary embodiment of the present invention.

Referring to FIG. 1, the electric power control system includes a plurality of domains D1, D2, D3, D4, and D5 that are formed with a plurality of hierarchies.

The domains D1-3 belong to a first hierarchy, which is a lowest-level hierarchy and each include at least one supply node 110, at least one demand node 120, at least one gateway node 130, and at least one distribution node 140.

The supply node 110 is a device that generates various electric power, such as a wind-power generation apparatus, a solar thermal power generation apparatus, and a battery and performs a function of generating and holding electric power, and supplying electric power to another node. The supply node 110 recognizes a holding amount of electric power that is generated by the supply node 110, transmits information thereof to another node, and supplies electric power according to an electric power demand request from the demand node 120.

The demand node 120 is a node requiring electric power, such as a home, a building, and an electric vehicle and includes an active demand node that requests electric power to the supply node 110 or the gateway node 130 by measuring and estimating an electric power demand amount and a passive demand node that is managed by the active demand node and that receives electric power.

The gateway node 130 generally collects electric power generation and holding information of a node that is included in each domain D1-3, provides the information to other domains D1-3, and transmits and receives a signal to and from a domain D4 belonging to a different hierarchy. The gateway node 130 determines an optimum supply node 110 according to an electric power request of the demand node 120. At least one of a plurality of supply nodes 110 can replace a function of the gateway node 130.

In order to transmit electric power from the supply node 110 to the demand node 120, the distribution node 140 controls physical power distribution.

The domain D4 belongs to a second hierarchy, which is a next lowest-level hierarchy and includes a supply and demand node 210, a gateway node 220, and a distribution node 230.

The supply and demand node 210 performs a function of the supply node 110 and the demand node 120, the gateway node 220 performs a function of the gateway node 130, and the distribution node 230 also performs a function of the distribution node 130. The supply and demand node 210 may separately exist, as in the supply node 110 and the demand node 120 of the domain D1-3.

The domain D5 belongs to an N-hierarchy, which is an uppermost-level hierarchy and includes a supply and demand node 310, a gateway node 320, and a distribution node 330.

Each node belonging to the same domains D1-5 shares in real-time information of the node by transmitting/receiving a routing protocol. Here, the node information includes identifiers of each node 110, 120, 130, and 140, authentication information of each node 110, 120, 130, and 140, a hierarchy and domain at which each node 110, 120, 130, and 140 participates, a position within an electric power network of each node 110, 120, 130, and 140, an electric power amount in which the supply node 110 holds, an estimate electric power amount in which the supply node 110 can generate per time, and an electric power amount in which the supply node 110 can provide at the present and the future. Further, the gateway nodes 130, 220, and 320 share in real-time information of each domain D1-5 by transmitting/receiving a routing protocol.

Now, the supply node 110 according to an exemplary embodiment of the present invention will be described in detail with reference to FIG. 2.

Figure 2:
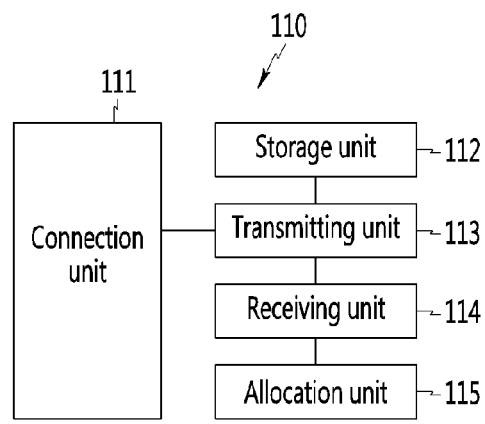
FIG. 2 is a block diagram of a supply node according to an exemplary embodiment of the present invention.

FIG. 2 is a block diagram of a supply node according to an exemplary embodiment of the present invention.

Referring to FIG. 2, the supply node 110 includes a connection unit 111, a storage unit 112, a transmitting unit 113, a receiving unit 114, and an allocation unit 115.

The connection unit 111 transmits an identifier and authentication information of the supply node 110 to an electric power network operation supervisor, thereby performing registration. The supply node 110 receives hierarchy information, a domain, etc., to operate through such registration. Further, the connection unit 111 connects to the allocated domain through a registration process.

The storage unit 112 stores an electric power amount in which the supply node 110 holds, an estimate electric power amount in which the supply node 110 can supply per time, and an electric power amount in which the supply node 110 can provide at the present and the future.

The transmitting unit 113 transmits an identifier of the supply node 110, authentication information of the supply node 110, a function of the supply node 110, topology information within a distribution network of the supply node 110, a hierarchy and domain at which the supply node 110 participates, a position within an electric power network of the supply node 110, an electric power amount in which the supply node 110 holds, an estimate electric power amount in which the supply node 110 can supply per time, an electric power amount in which the supply node 110 can provide at the present and the future, topology information within a distribution network, a physical power line capacity, and link information to neighboring nodes, i.e., at least one of another supply node, the demand node 120, and the gateway node 130.

The receiving unit 114 receives information of a corresponding node from a neighboring node. Further, the receiving unit 114 receives an electric power demand request from the demand node 120 or the gateway node 130.

When an electric power demand request exists, the allocation unit 115 determines a holding electric power amount and allocates and supplies electric power to the corresponding demand node 120.

Now, the demand node 120 according to an exemplary embodiment of the present invention will be described in detail with reference to FIG. 3.

Figure 3:
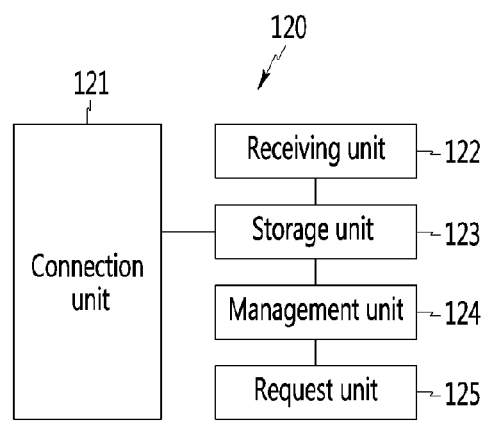
FIG. 3 is a block diagram of a demand node according to an exemplary embodiment of the present invention.

FIG. 3 is a block diagram of a demand node according to an exemplary embodiment of the present invention.

Referring to FIG. 3, the demand node 120 includes a connection unit 121, a receiving unit 122, a storage unit 123, a management unit 124, and a request unit 125.

The connection unit 121 performs registration by transmitting an identifier and authentication information of the demand node 120 to an electric power network operation supervisor and receives hierarchy information, a domain, etc., to operate. Further, the connection unit 121 connects to the allocated domain through a registration process.

The receiving unit 122 receives information that is transmitted by the transmitting unit 113 of the supply node 110 from the neighboring supply node 110 or the gateway node 130.

The storage unit 123 stores information that is received by the receiving unit 122.

The management unit 124 monitors an electric power amount of another demand node in which the management unit 124 manages and grasps a requiring electric power amount based on estimate information about electric power demand increase and decrease.

The request unit 125 selects the optimum supply node 110 according to management contents of the management unit 124 and information that is stored in the storage unit 123, thereby directly requesting a necessary electric power amount to the corresponding supply node 110 or requesting a necessary electric power amount to the gateway node 130. In this case, information that the request unit 125 transmits to the supply node 110 or the gateway node 130 includes an electric power amount in which the demand node 120 requires, an electric power use estimate time period of the demand node 120, an identifier of the demand node 120, and other constrains.

Now, a method of controlling electric power according to an exemplary embodiment of the present invention will be described in detail with reference to FIG. 4.

Figure 4:
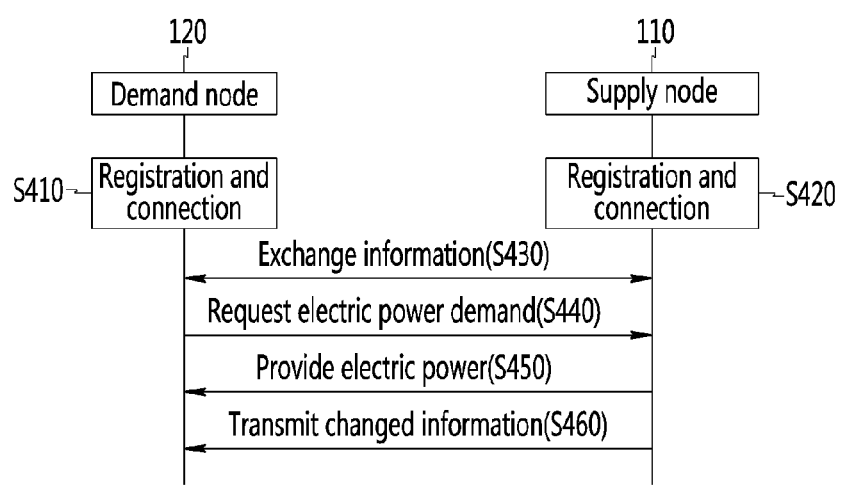
FIG. 4 is a flowchart illustrating a method of controlling electric power according to an exemplary embodiment of the present invention.

FIG. 4 is a flowchart illustrating a method of controlling electric power according to an exemplary embodiment of the present invention.

Referring to FIG. 4, the supply node 110 and the demand node 120 each perform registration and connection using identifiers and authentication information thereof (S410 and S420).

Thereafter, the supply node 110 and the demand node 120 transmit/receive routing protocols thereof, thereby exchanging information thereof (S430). Here, the information indicates information that is transmitted by the transmitting unit 113 of the supply node 110 and information that is transmitted by the request unit 125 of the demand node 120. In this case, although not shown, the supply node 110 and the demand node 120 may exchange information through the gateway node 130.

The demand node 120 selects the optimum supply node 110 based on information about the supply node 110 that is received and stored from the supply node 110 and requests an electric power demand (S440). In this case, the demand node 120 is an active demand node, and requesting electric power may be electric power that is required by an active demand node, or electric power that is required by a passive demand node in which an active demand node manages. In a process of FIG. 4, the optimum supply node 110 that is selected by the demand node 120 may be a supply node 110 that can provide a necessary electric power amount among a plurality of supply nodes that are included in the same domain and that is positioned at the nearest distance.

The supply node 110 receives an electric power demand request from the demand node 120 and then provides electric power to the corresponding demand node 120 (S450). In this case, electric power that is transmitted from the supply node 110 to the demand node 120 can be physically controlled by the distribution node 130.

Thereafter, the supply node 110 transmits information that is changed according to providing of electric power, i.e., information about a holding electric power amount to the demand node 120 (S460).

Now, a method of controlling electric power according to another exemplary embodiment of the present invention will be described in detail with reference to FIG. 5.

Figure 5:
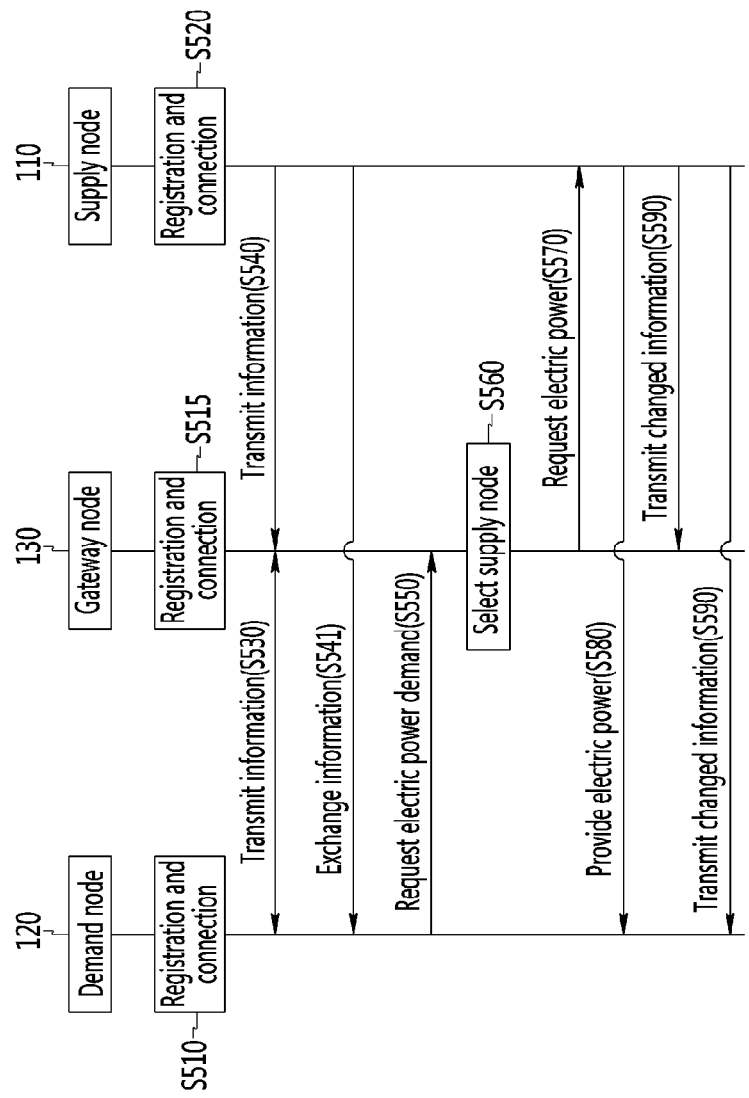
FIG. 5 is a flowchart illustrating a method of controlling electric power according to another exemplary embodiment of the present invention.

FIG. 5 is a flowchart illustrating a method of controlling electric power according to another exemplary embodiment of the present invention.

Referring to FIG. 5, the supply node 110, the demand node 120, and the gateway node 130 each perform registration and connection using identifiers and authentication information thereof (S510, S515, and S520).

Thereafter, the supply node 110 and the demand node 120 transmit routing protocols thereof to the gateway node 130, thereby providing information thereof (S530 and S540). Here, the information indicates information that is transmitted by the transmitting unit 113 of the supply node 110 and information that is transmitted by the request unit 125 of the demand node 120.

The gateway node 130 transmits information that is received from the supply node 110 and the demand node 120 to other nodes in a bundle, thereby allowing to automatically recognize information about a new node that is entered within a system. Further, the gateway node 130 transmits such information to the gateway nodes 220 and 320 that are included in another domain, thereby allowing to share information of all nodes existing within a system.

The supply node 110 and the demand node 120 transmit routing protocols thereof, thereby exchanging information thereof (S541).

The demand node 120 requests an electric power demand to the gateway node 130 (S550). In this case, the demand node 120 is an active demand node, and requesting electric power may be electric power that is required by an active demand node, or electric power that is required by a passive demand node in which an active demand node manages.

Thereafter, the gateway node 130 selects an optimum supply node 110 based on information about the supply node 110 (S560). Here, the optimum supply node 110 can provide a necessary electric power amount to a plurality of supply nodes that are included in the same domain and may be a supply node 110 that is positioned at the nearest distance.

Thereafter, the gateway node 130 requests to provide electric power to the selected supply node 110 (S570).

The supply node 110 provides electric power to the corresponding demand node 120 (S580).

Thereafter, the supply node 110 transmits information that is changed according to providing of electric power, i.e., information about a holding electric power amount to the demand node 120 and the gateway node 130 (S590).

Now, a method of controlling electric power according to another exemplary embodiment of the present invention will be described in detail with reference to FIG. 6.

FIG. 6 is a flowchart illustrating a method of controlling electric power according to another exemplary embodiment of the present invention.

Referring to FIG. 6, the gateway node 220 belonging to the domain D4 of two hierarchies and a supply node 119 belonging to the domain D2 of one hierarchy, the demand node 120 belonging to the domain D1 of one hierarchy, the gateway node 130 belonging to the domain D1 of one hierarchy and a gateway node 139 belonging to the domain D2 of one hierarchy each perform registration and connection using identifiers and certification information thereof (S611, S612, S613, S614, S615).

Thereafter, the demand node 120 transmits a routing protocol thereof to the gateway node 130, thereby providing information thereof to the gateway node 130 (S621), and the supply node 119 transmits a routing protocol thereof to the gateway node 139, thereby providing information thereof to the gateway node 139 (S622). Further, the gateway nodes 130 and 139 transmit a routing protocol to the gateway node 220, thereby transmitting information about domains D1 and D2 thereof (S623 and S624).

The demand node 120 requests an electric power demand to the gateway node 130 (S630). In this case, the demand node 120 is an active demand node, and requesting electric power may be electric power that is required by an active demand node, or electric power that is required by a passive demand node in which an active demand node manages.

Thereafter, the gateway node 130 determines an optimum supply node based on information about the supply node 110 (S640). In this case, when the gateway node 130 cannot find an optimum supply node in the corresponding domain D1, the gateway node 130 requests electric power to the gateway node 220 of the domain D4 that is included in an upper-level hierarchy (S651).

Thereafter, the gateway node 220 exists at the same hierarchy as that of a domain D1 to which the gateway node 130 belongs and requests electric power to the gateway node 139 that belongs to another domain D2 (S652).

The gateway node 139 requests electric power by selecting an optimum supply node 119 in a domain D2 to which the gateway node 139 belongs (S653).

Thereafter, the supply node 119 provides electric power to the demand node 120 (S660).

Thereafter, the supply node 119 transmits information that is changed according to providing of electric power, i.e., information about a holding electric power amount to the gateway node 139 (S670). Thereafter, the gateway node 139 transmits again the changed information to the gateway node 220 and the gateway node 130, thereby allowing to share the changed information in an entire electric power control system (S680).

In the present exemplary embodiment, the gateway node 220 requests electric power to the gateway node 139, but when an optimum supply node is determined as another supply node 210 belonging to the domain D4 in which the gateway node 220 is included, the gateway node 220 provides electric power by requesting electric power to the supply node 210.

Further, the supply node 119, the demand node 120, and the gateway nodes 130, 139, and 220 can manage a history about electric power request contents and a processing result using an identifier after processing an electric power demand request and calculate a cost based on the history.

The power control system shares information of a supply node in real-time, determines an optimum supply node to provide electric power based on the information, and supplies electric power to the demand node, and thus the electric power network system can increase efficiency at generation, supply, and consumption processes of electric power. Further, when no supply node to provide electric power exists within one domain, a supply node to provide electric power is determined within another domain and such determination is gradually performed by a hierarchically defined domain and thus efficiency of electric power control can be further improved.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An electric power generation device comprising:
   a storage unit that stores information about the electric power generation device;
   a transmitting unit that transmits information about the electric power generation device to a neighboring electric power demand device;
   wherein the information about the electric power generation device comprises an electric power amount in which the electric power generation device holds and a position of the electric power generation device;
   a receiving unit that receives an electric power demand request from the neighboring electric power demand device; and
   an allocation unit that allocates electric power according to the electric power demand request.

2. The electric power generation device of claim 1, wherein the electric power generation device operates in one domain of an electric power network that is formed with a plurality of domains belonging to at least one of a plurality of hierarchies.

3. The electric power generation device of claim 2, further comprising a connection unit that registers to the electric power network to receive a domain in which the electric power generation device is to operate and to connect to the domain.

4. The electric power generation device of claim 3, wherein the information about the electric power generation device comprises at least one of an identifier, authentication information, and domain information, topology information within the electric power network, an electric power line capacity, and link information of the electric power generation device.

5. The electric power generation device of claim 2, wherein the transmitting unit further transmits information about the electric power generation device to a gateway node that collects the domain information, and
   the receiving unit receives the electric power demand request through the gateway node.

6. An electric power demand device comprising:
   a receiving unit that receives, from a neighboring electric power generation device, information of the electric power generation device;
   wherein the information about the electric power generation device comprises an electric power amount in which the electric power generation device holds and a position of the electric power generation device;
   a management unit that grasps a necessary electric power amount; and
   a request unit that requests an electric power demand based on the necessary electric power amount and information of the electric power generation device.

7. The electric power demand device of claim 6, wherein the electric power demand device operates in one domain of an electric power network that is formed with a plurality of domains belonging to at least one of a plurality of hierarchies.

8. The electric power demand device of claim 7, further comprising a connection unit that registers to the electric power network to receive a domain in which the electric power generation device is to operate and to connect to the domain.

9. The electric power demand device of claim 7, wherein the request unit transmits at least one of the necessary electric power amount, an electric power use estimate time period, and constrains.

10. The electric power demand device of claim 7, wherein the request unit requests the electric power demand by selecting an optimum electric power generation device or requests the electric power demand to a gateway node that collects the domain information.

11. The electric power demand device of claim 6, wherein the management unit manages another electric power demand device; and
    the electric power demand is related to the another electric power demand device.

12. An electric power control system comprising a plurality of domains belonging to one of a plurality of hierarchies, the electric power control system comprising:
    a plurality of domains each comprise
    a plurality of supply nodes that transmit information comprising an electric power amount in which the electric power control system holds and a position of the electric power control system and that allocate electric power according to a request; and
    a plurality of demand nodes that receive the information and that request an electric power demand to the supply node.

13. The electric power control system of claim 12, wherein the plurality of domains further comprise a gateway node that collects information about the plurality of domains.

14. The electric power control system of claim 13, wherein the plurality of supply nodes each transmit the information to the gateway node and at least one of the plurality of demand nodes; and
    the plurality of demand nodes each request the electric power demand by selecting an optimum supply node of the plurality of supply nodes or request the electric power demand to the gateway node.

15. The electric power control system of claim 13, wherein the gateway node exchanges information about the plurality of domains with the gateway node belonging to another domain.

16. A method of controlling electric power of an electric power control system comprising a plurality of domains belonging to one of a plurality of hierarchies, the method comprising:
    transmitting, by a supply node, information including a holding electric power amount and a position to a demand node;
    selecting, by the demand node, an optimum supply node based on the information and requesting an electric power demand; and
    supplying, by the optimum supply node, electric power to the demand node.

17. A method of controlling electric power of an electric power control system comprising a plurality of domains belonging to one of a plurality of hierarchies, the method comprising:
    transmitting, by a supply node, information including a holding electric power amount and a position to a gateway node;
    requesting, by the demand node, an electric power demand to the gateway node;

selecting, by the gateway node, an optimum supply node based on the information and requesting the electric power demand; and supplying, by the optimum supply node, electric power to the demand node.

18. The method of claim 17, further comprising sharing, by the gateway node, the information with a gateway node belonging to another domain and requesting the electric power demand to the gateway node belonging to the another domain.

19. The method of claim 18, wherein the gateway node belonging to the another domain belongs to a hierarchy different from that of the gateway node.

* * * * *